United States Patent
Lee et al.

(10) Patent No.: US 12,460,236 B2
(45) Date of Patent: *Nov. 4, 2025

(54) FRUCTOSE-4-EPIMERASE AND METHOD FOR PREPARING TAGATOSE USING SAME

(71) Applicant: CJ CHEILJEDANG CORPORATION, Seoul (KR)

(72) Inventors: Young Mi Lee, Seoul (KR); Eul-Soo Park, Seoul (KR); Sun Mi Shin, Seoul (KR); Seong Bo Kim, Seoul (KR); Eun Jung Choi, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 893 days.

This patent is subject to a terminal disclaimer.

(21) Appl. No.: 17/635,157

(22) PCT Filed: Aug. 13, 2020

(86) PCT No.: PCT/KR2020/010725
§ 371 (c)(1),
(2) Date: Aug. 9, 2022

(87) PCT Pub. No.: WO2021/029688
PCT Pub. Date: Feb. 18, 2021

(65) Prior Publication Data
US 2022/0380818 A1    Dec. 1, 2022

(30) Foreign Application Priority Data
Aug. 14, 2019 (KR) .......... 10-2019-0099815

(51) Int. Cl.
*C12P 19/02* (2006.01)
*C12N 9/90* (2006.01)
*C12P 19/24* (2006.01)

(52) U.S. Cl.
CPC ........... *C12P 19/02* (2013.01); *C12N 9/90* (2013.01); *C12P 19/24* (2013.01); *C12Y 501/03* (2013.01)

(58) Field of Classification Search
CPC . C12P 19/02; C12P 19/24; C12N 9/90; C12N 15/52; C12Y 501/03; C12R 2001/01; C12R 2001/19
See application file for complete search history.

(56) References Cited

U.S. PATENT DOCUMENTS

| | | | | |
|---|---|---|---|---|
| 11,459,594 B2 * | 10/2022 | Lee | .......... | C12N 9/88 |
| 11,753,646 B2 * | 9/2023 | Lee | .......... | C12N 9/88 |
| | | | | 435/69.1 |
| 2023/0041854 A1 * | 2/2023 | Lee | .......... | C12P 19/24 |

FOREIGN PATENT DOCUMENTS

| | | |
|---|---|---|
| KR | 10-2009-0082774 A | 7/2009 |
| KR | 10-2015-0042391 A | 4/2015 |
| KR | 10-2017-0015250 A | 2/2017 |
| KR | 10-20180027962 A | 3/2018 |
| KR | 10-2018-0111678 A | 10/2018 |
| KR | 10-2018-0111679 A | 10/2018 |
| KR | 10-20190001934 A | 1/2019 |
| KR | 10-1987586 B1 | 6/2019 |
| KR | 10-2074957 B1 | 2/2020 |

OTHER PUBLICATIONS

Broun et al., Catalytic plasticity of fatty acid modification enzymes underlying chemical diversity of plant lipids. Science, 1998, vol. 282: 1315-1317. (Year: 1998).*
Devos et al., Practical limits of function prediction. Proteins: Structure, Function, and Genetics. 2000, vol. 41: 98-107. (Year: 2000).*
Seffernick et al., Melamine deaminase and Atrazine chlorohydrolase: 98 percent identical but functionally different. J. Bacteriol., 2001, vol. 183 (8): 2405-2410. (Year: 2001).*
Whisstock et al., Prediction of protein function from protein sequence. Q. Rev. Biophysics., 2003, vol. 36 (3): 307-340. (Year: 2003).*
Witkowski et al., Conversion of b-ketoacyl synthase to a Malonyl Decarboxylase by replacement of the active cysteine with glutamine. Biochemistry, 1999, vol. 38: 11643-11650. (Year: 1999).*
International Search Report and Written opinion of PCT/KR2020/010725 mailed Dec. 7, 2020, together with the English Translation of the International Search Report; total of 12 pages.
NCBI, Genbank accession No. WP_015868068.1, "D-tagatose-bisphosphate aldolase, class II, non-catalytic subunit [Kosmotoga olearia])", Jun. 20, 2019.
Lee, S.-H. et al., "Structure-based prediction and identification of 4-epimerization activity of phosphate sugars in class II aldolases", Scientific Reports, May 16, 2017, vol. 7, No. 1934, pp. 1-9; DOI: 10.1038/s41598-017-02211-3.
Extended European search report of EP application No. 20852310.0 dated Dec. 12, 2022; 8 pages.
Rodionova et al., "Tagaturonate-fructuronate epimerase UxaE, a novel enzyme in the hexuronate catabolic network in Thermotoga maritime", Environmental Microbiology, vol. 14, No. 11, Aug. 23, 2012, pp. 2920-2934; XP55300286.

* cited by examiner

*Primary Examiner* — Ganapathirama Raghu
(74) *Attorney, Agent, or Firm* — Squire Patton Boggs (US) LLP

(57) ABSTRACT

The present application relates to a fructose-4-epimerase variant exhibiting tagatose conversion activity and a method for preparing tagatose using the same.

12 Claims, 2 Drawing Sheets
Specification includes a Sequence Listing.

[Fig. 1]
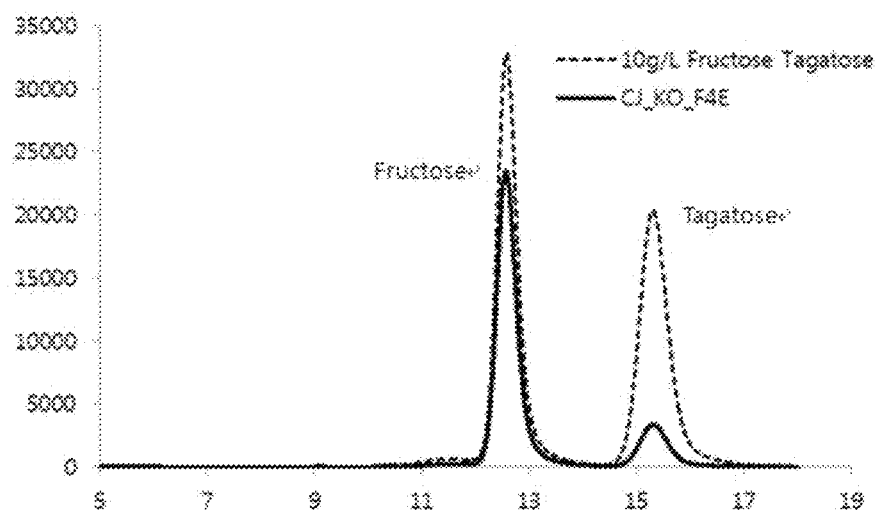
[Fig. 2]
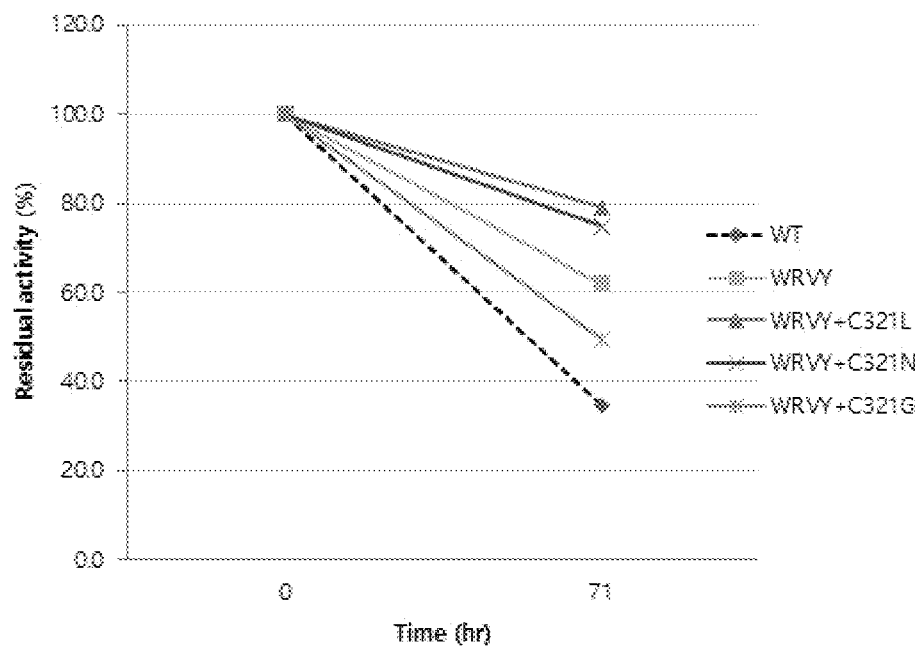

[Fig. 3]
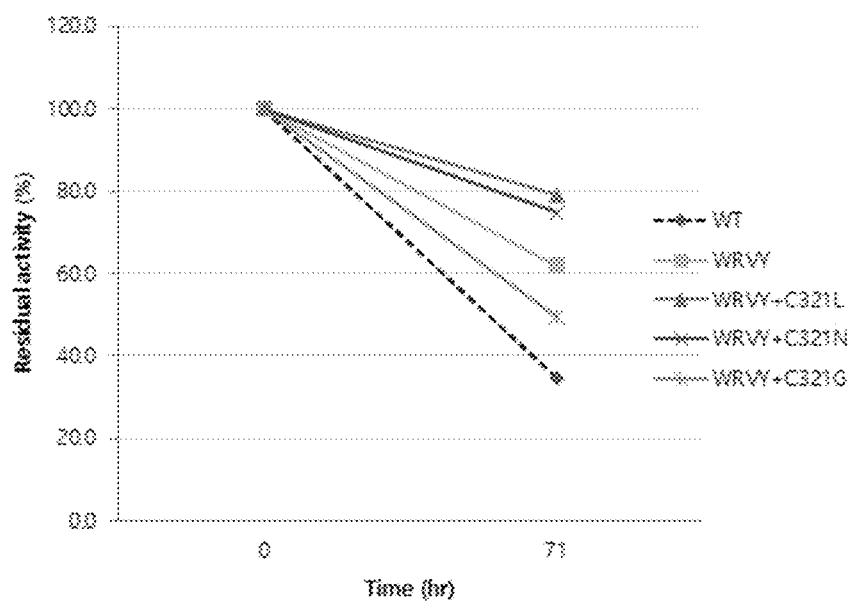

FRUCTOSE-4-EPIMERASE AND METHOD FOR PREPARING TAGATOSE USING SAME

TECHNICAL FIELD

The present application relates to a fructose-4-epimerase variant with improved conversion activity or stability and a method for preparing tagatose using the same.

BACKGROUND ART

Tagatose has a natural sweetness that is almost indistinguishable from sugar, and the physical properties thereof are also similar to those of sugar. Tagatose is a natural sweetener present in a small amount in foods such as milk, cheese, cacao, and sweet natural fruits such as apples and tangerines. The caloric content of tagatose is 1.5 kcal/g, which is ⅓ that of sugar, and the glycemic index (GI) thereof is 3, which is 5% of that of sugar. Tagatose has a variety of health functions while having a sweet taste similar to that of sugar, and may thus be used as an alternative sweetener that can satisfy both health and taste needs when applied to various products.

Conventionally known methods for producing tagatose include a chemical (catalytic reaction) method and a biological (isomerase reaction) method using galactose as a raw material (see Korean Patent publication No. 2009-0082774). In order to economically obtain galactose, which is a raw material for the reactions, studies have been conducted on various basic raw materials containing galactose and a method for obtaining galactose therefrom and preparing tagatose. A typical basic raw material for obtaining galactose is lactose, but there is a limit to the stable supply of raw materials for tagatose production since the price of lactose or lactose-containing products changes unstably depending on the production, demand, and supply of raw milk and lactose in the international market. Hence, there is a need for a new method for preparing tagatose using generalized simple sugars (sugar, glucose, fructose, and the like).

Meanwhile, it is known that tagatose-bisphosphate aldolase uses D-tagatose 1,6-bisphosphate as a substrate to produce glycerone phosphate and D-glyceraldehyde 3-phosphate, and that it is involved in galactose metabolism. However, while there have been no studies on whether the tagatose-bisphosphate aldolase exhibits activity to produce tagatose, Korean Patent publication No. 2018-0111678 has confirmed that tagatose-bisphosphate aldolase has a function of converting fructose into tagatose.

DISCLOSURE

Technical Problem

The present inventors have discovered a novel modified protein comprising one or more amino acid substitutions in the amino acid sequence of SEQ ID NO: 1 and confirmed that the modified protein exhibits conversion activity as in the wild type of SEQ ID NO: 1 or exhibits improved conversion activity or stability compared to that of the wild type and increases the tagatose production capacity, thereby completing the present application.

Technical Solution

An object of the present application is to provide a fructose-4-epimerase variant comprising an amino acid sequence in which amino acid residues corresponding to positions 97, 124, 367, and 390 from the N-terminus of the amino acid sequence of SEQ ID NO: 1 are substituted with other amino acids.

Another object of the present application is to provide a polynucleotide encoding the fructose-4-epimerase variant of the present application.

Another object of the present application is to provide a vector comprising the polynucleotide of the present application.

Another object of the present application is to provide a microorganism comprising the variant of the present application, the polynucleotide of the present application, or the vector of the present application.

Another object of the present application is to provide a composition for tagatose production comprising the fructose-4-epimerase variant of the present application; a microorganism comprising the variant of the present application, the polynucleotide of the present application, or the vector of the present application; or a culture of the microorganism of the present application.

Another object of the present application is to provide a method for preparing tagatose, the method comprising: (a) bringing the fructose-4-epimerase variant of the present application; a microorganism comprising the variant of the present application, the polynucleotide of the present application, or the vector of the present application; or a culture of the microorganism of the present application into contact with fructose; and (b) converting the fructose into tagatose.

Advantageous Effects

The fructose-4-epimerase variant of the present application is industrially capable of producing tagatose that exhibits excellent properties and converts fructose, a generalized sugar, into tagatose, and thus has high economic efficiency.

BRIEF DESCRIPTION OF DRAWINGS

FIG. 1 is HPLC chromatography results illustrating that the T124W_N97Y_N367V_T390R (CJ_KO_F4E) variant of the present application exhibits fructose-4-epimerase activity; and FIGS. 2 and 3 are results acquired by measuring the thermostability of selected variants over time at 60° C.

DETAILED DESCRIPTION OF THE INVENTION

The configuration and effects of the present application will be described in detail as follows. Meanwhile, each description and embodiment disclosed in the present application may be applied to each other description and embodiment. That is, all combinations of the various elements disclosed in the present application fall within the scope of the present application. In addition, it cannot be seen that the scope of the present application is limited by the specific descriptions described below.

In order to achieve the objects, an aspect of the present application provides a fructose-4-epimerase variant comprising an amino acid sequence in which amino acid residues corresponding to positions 97, 124, 367, and 390 from the N-terminus of the amino acid sequence of SEQ ID NO: 1 are substituted with other amino acids.

As used herein, the term "fructose-4-epimerase" is an enzyme exhibiting fructose-4-epimerization activity that epimerizes the 4th carbon position of fructose to convert fructose into tagatose. For the purposes of the present application, fructose-4-epimerase may include any enzyme without limitation as long as it is an enzyme capable of producing tagatose using fructose as a substrate, and tagatose-bisphosphate aldolase or tagatose-bisphosphate aldolase class II accessory protein, EC 4.1.2.40, in KEGG (Kyoto Encyclopedia of Genes and Genomes), a known database, may be included in fructose-4-epimerase as long as it exhibits the activity of converting fructose as a substrate into tagatose. The tagatose-bisphosphate aldolase is known as an enzyme for producing glycerone phosphate and D-glyceraldehyde 3-phosphate using D-tagatose 1,6-bisphosphate as a substrate as presented in [Scheme 1] below.

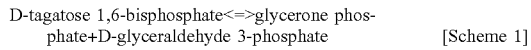

D-tagatose 1,6-bisphosphate<=>glycerone phosphate+D-glyceraldehyde 3-phosphate   [Scheme 1]

In addition, tagatose-6-phosphate kinase (EC 2.7.1.144) may be included in fructose-4-epimerase as long as it exhibits the activity of converting fructose as a substrate into tagatose. The tagatose-6-phosphate kinase is known as an enzyme for producing ADP and D-tagatose 1,6-bisphosphate using ATP and D-tagatose 6-phosphate as substrates as presented in [Scheme 2] below.

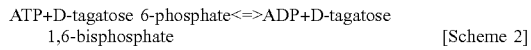

ATP+D-tagatose 6-phosphate<=>ADP+D-tagatose 1,6-bisphosphate   [Scheme 2]

With regard to the activity of fructose-4-epimerase, the conversion rate from fructose as a substrate into tagatose (conversion rate=tagatose weight/initial fructose weight× 100) is 0.01% or more, specifically 0.1% or more, and more specifically 0.3% or more. More specifically, the conversion rate may be in a range of 0.01% to 100%, a range of 0.3% to 100%, a range of 0.1% to 50%, or a range of 0.3% to 100%.

The amino acid sequence of SEQ ID NO: 1 can be obtained from GenBank of the NCBI or KEGG (Kyoto Encyclopedia of Genes and Genomes), a known database. As an example, the amino acid sequence of SEQ ID NO: 1 may be derived from *Kosmotoga olearia*, more specifically may be a polypeptide/protein comprising the amino acid sequence set forth in SEQ ID NO: 1, but is not limited thereto. The amino acid sequence of SEQ ID NO: 1 may include the amino acid sequence of SEQ ID NO: 1 or an amino acid sequence that has 70% or more homology or identity thereto and exhibits efficacy corresponding to the fructose-4-epimerase activity of the present application, but is not limited thereto. Specifically, the amino acid sequence may include an amino acid sequence of SEQ ID NO: 1 and an amino acid sequence that has 70%, 80%, 85%, 90%, 95%, 96%, 97%, 98%, or 99% or more homology or identity to SEQ ID NO: 1 and exhibits efficacy corresponding to the fructose-4-epimerase activity of the present application. It is apparent that a protein having an amino acid sequence in which some sequences are deleted, modified, substituted or added is also included within the scope of the present application as long as it is an amino acid sequence that has such homology or identity and exhibits efficacy corresponding to the fructose-4-epimerase.

In other words, even if it is described as a "protein, enzyme or polypeptide having an amino acid sequence set forth in a specific SEQ ID NO" in the present application, it is apparent that a protein having an amino acid sequence in which some sequences are deleted, modified, substituted, conservatively substituted or added may also be used in the present application as long as it exhibits activity the same as or corresponding to that of the protein consisting of the amino acid sequence of the corresponding SEQ ID NO. For example, it is apparent that the addition of sequences, which do not alter the function of the protein, before or after the amino acid sequence, naturally occurring mutations, silent mutations thereof or conservative substitutions are not excluded and a protein having an amino acid sequence having such sequence additions or mutations also fall within the scope of the present application as long as the protein exhibits activity the same as or corresponding to that of the modified protein.

As used herein, the term "tagatose" is a kind of ketohexose among monosaccharides and is used interchangeably with "D-tagatose".

The "amino acid residue corresponding to position N" of the present application may include an amino acid residue at position N and a position corresponding to position N. Specifically, the amino acid residue corresponding to position N may include an amino acid position corresponding to an arbitrary amino acid residue in a mature polypeptide disclosed in a specific amino acid sequence. The specific amino acid sequence may be the amino acid sequence of SEQ ID NO: 1.

The amino acid residue corresponding to position N or the amino acid position corresponding to an arbitrary amino acid residue in the mature polypeptide disclosed in a specific amino acid may be determined using the Needleman-Wunsch algorithm (Needleman and Wunsch, 1970, *J. Mol. Biol.* 48:443-453), specifically version 5.0.0 or later as implemented in the Needle program of the EMBOSS package (EMBOSS: The European Molecular Biology Open Software Suite, Rice et al., 2000, *Trends Genet.* 16:276-277). The parameters used may be a gap open penalty of 10, a gap extension penalty of 0.5, and an EBLOSUM62 (EMBOSS version of BLOSUM62) permutation matrix.

The amino acid residue corresponding to position N or an amino acid residue at the amino acid position corresponding to an arbitrary amino acid residue in the mature polypeptide disclosed in the specific amino acid may be determined by alignment of multiple polypeptide sequences using, but not limited to, several computer programs using their respective default parameters, including multiple sequence comparison by log-expectation (MUSCLE; version 3.5 or later); Edgar, 2004, *Nucleic Acids Research* 32:1792-1797, MAFFT (version 6.857 or later; Katoh and Kuma, 2002, *Nucleic Acids Research* 30:3059-3066; Katoh et al., 2005, *Nucleic Acids Research* 33:511-518; Katoh and Toh, 2007, *Bioinformatics* 23:372-374; Katoh et al., 2009, *Methods in Molecular Biology* 537:39-64; Katoh and Toh, 2010, *Bioinformatics* 26:1899-1900 and EMBOSS EMMA using ClustalW (1.83 or later); and Thompson et al., 1994, *Nucleic Acids Research* 22:4673-4680.

When other polypeptides deviate from the mature polypeptide of a specific amino acid sequence such that conventional sequence-based comparisons do not detect their relation (Lindahl and Elofsson, 2000, *J. Mol. Biol.* 295:613-615), other pairwise sequence comparison algorithms may be used. Greater sensitivity in sequence-based searches may be achieved using search programs that use probabilistic representations of polypeptide families (profiles) to search databases. For example, the PSI-BLAST program can calculate a profile and detect distant homologues through an iterative database search process (Atschul et al., 1997, *Nucleic Acids Res.* 25:3389-3402). Even greater sensitivity may be achieved if a family or superfamily for a polypeptide has one or more indications in the protein structure database. Programs such as GenTHREADER (Jones, 1999, *J. Mol. Biol.* 287:797-815; McGuffin and Jones, 2003, *Bioinformatics* 19:874-881) use information from a variety of sources (PSI-BLAST, secondary structure prediction, alignment profiles and solvation potentials) as input to neural networks that predict structural folding for query sequences. Similarly, literature (Gough et al., 2000, *J. Mol. Biol.* 313:903-919) methods may be used to align sequences of unknown structures with superfamily models present in the SCOP database. These alignments may in turn be used to create models of homology, similarity, or identity for the polypeptides, and these models may be evaluated for accuracy using various tools developed for that purpose.

The "other amino acid" of the present application is not limited as long as it is an amino acid other than the amino acid corresponding to each position. "Amino acids" are classified into four kinds: acidic, basic, polar (hydrophilic), and non-polar (hydrophobic) depending on the nature of the side chain.

Specifically, the other amino acid of the present application may be one or more amino acids selected from the group consisting of nonpolar amino acids glycine (G), alanine (A), valine (V), leucine (L), isoleucine (I), methionine (M), phenylalanine (F), tryptophan (W), and proline (P); polar amino acids serine (S), threonine (T), cysteine (C), tyrosine (Y), asparagine (N), and glutamine (Q); acidic amino acids aspartic acid (D) and glutamic acid (E); and basic amino acids lysine (K), arginine (R), and histidine (H), but is not limited thereto.

More specifically, the other amino acid of the present application may be selected from the group consisting of a non-polar amino acid, a polar amino acid, and a basic amino acid, and the non-polar amino acid, polar amino acid, and basic amino acid may be selected from the group consisting of tyrosine (Y), tryptophan (W), valine (V), and arginine (R), but the other amino acid is not limited thereto. For example, the amino acid residue corresponding to position 97 may be one in which asparagine (N) is substituted with tyrosine (Y) but is not limited thereto, the amino acid residue corresponding to position 124 may be one in which threonine (T) is substituted with tryptophan (W) but is not limited thereto, the amino acid residue corresponding to position 367 may be one in which asparagine (N) is substituted with valine (V) but is not limited thereto, and the amino acid residue corresponding to position 390 may be one in which threonine (T) is substituted with arginine (R) but is not limited thereto. The variant of the present application may include an amino acid sequence in which amino acid residues corresponding to one or more positions selected from the group consisting of positions 158, 321, 210, 239, and 318 are additionally substituted with other amino acids in the amino acid sequence in which amino acid residues corresponding to positions 97, 124, 367, and 390 from the N-terminus of fructose-4-epimerase comprising the amino acid sequence of SEQ ID NO: 1 are substituted with other amino acids, but is not limited thereto. In addition, the variant of the present application may include an amino acid sequence in which amino acid residues corresponding to one or more positions selected from the group consisting of positions 210, 239, and 318 are additionally substituted with other amino acids in the amino acid sequence in which amino acid residues corresponding to positions 97, 124, 367, and 390 and position 158 and/or position 321 from the N-terminus of fructose-4-epimerase comprising the amino acid sequence of SEQ ID NO: 1 are substituted with other amino acids, but is not limited thereto.

The amino acid residues corresponding to one or more positions selected from the group consisting of positions 158, 321, 210, 239, and 318 may be substituted with a non-polar amino acid, a polar amino acid, an acidic amino acid, or a basic amino acid, specifically may be substituted with an amino acid selected from the group consisting of glutamine (Q), histidine (H), alanine (A), valine (V), glycine (G), threonine (T), glutamic acid (E), methionine (M), arginine (R), leucine (L), asparagine (N), isoleucine (I), and lysine (K), but are not limited thereto. More specifically, the amino acid corresponding to position 158 may be substituted with a non-polar amino acid, a polar amino acid, an acidic amino acid or a basic amino acid, and may be substituted with glutamine (Q), histidine (H), alanine (A), valine (V), glycine (G), threonine (T), glutamic acid (E), methionine (M), arginine (R), or leucine (L). The amino acid corresponding to position 321 may be substituted with a non-polar amino acid, an acidic amino acid, or a basic amino acid, and may be substituted with glycine (G), alanine (A), valine (V), isoleucine (I), asparagine (N), glutamic acid (E), lysine (K), or leucine (L). The amino acid corresponding to position 210 may be substituted with a polar amino acid, and more specifically may be substituted with cysteine (C). The amino acid corresponding to position 239 may be substituted with a basic amino acid, and may be substituted with lysine (K), but is not limited thereto. The amino acid at position 318 may be substituted with a non-polar amino acid, and may be substituted with glycine (G).

The fructose-4-epimerase variant of the present application may include an amino acid sequence which is different from the recited amino acid sequence in conservative substitution and/or modification of one or more amino acid residues other than the substitution of an amino acid residue corresponding to a specific position (for example, a position selected from the group consisting of positions 97, 124, 367, and 390 and positions 158, 321, 210, 239, and 318 from the N-terminus of the amino acid sequence of SEQ ID NO: 1) with another amino acid residue, but maintains the functions or properties of fructose-4-epimerase.

As used herein, the term "conservative substitution" means to substitute one amino acid with another amino acid exhibiting similar structural and/or chemical properties. The variant may have, for example, one or more conservative substitutions while still retaining one or more biological activities. Conservative substitutions have little or no effect on the activity of the resulting polypeptide.

The mutant in which one or more amino acids other than the above-mentioned amino acids at specific positions are mutated may include deletion or addition of amino acids having minimal effect on the properties and secondary structure of the polypeptide. For example, the polypeptide may be conjugated with a signal (or leader) sequence at the N-terminus of the protein involved in the transfer of the protein either co-translationally or post-translationally. The polypeptide may be conjugated with other sequences or linkers to enable identification, purification, or synthesis of polypeptide.

For the purpose of the present application, the fructose-4-epimerase variant exhibits improved conversion activity or stability compared to the wild type.

The term "conversion activity" means to epimerize the 4th carbon position of D-fructose (fructose) and convert D-fructose into tagatose, and the term "stability" means to exhibit thermostability as an enzyme exhibiting high heat resistance.

Specifically, the fructose-4-epimerase variant of the present application exhibits improved activity of epimerizing the 4th carbon position of D-fructose (fructose) and converting D-fructose into tagatose compared to that of the wild-type fructose-4-epimerase comprising the amino acid sequence of SEQ ID NO: 1.

For example, the fructose-4-epimerase variant of the present application may be an enzyme exhibiting high heat resistance. Specifically, the fructose-4-epimerase variant of the present application may exhibit activity to be 50% to 100%, 60% to 100%, 70% to 100%, or 75% to 100% of the maximum activity at 50° C. to 70° C. More specifically, the fructose-4-epimerase variant of the present application may exhibit activity to be 80% to 100% or 85% to 100% of the maximal activity at 55° C. to 60° C., 60° C. to 70° C., 55° C., 60° C., or 70° C.

The fructose-4-epimerase variant may be, for example, a variant as presented in Tables 3 to 6, but is not limited thereto.

Another aspect of the present application is to provide a polynucleotide encoding the fructose-4-epimerase variant of the present application, or a vector comprising the polynucleotide of the present application.

As used herein, the term "polynucleotide" means a DNA or RNA strand of a certain length or longer as a polymer of nucleotides in which nucleotide monomers are covalently linked in a long chain shape, more specifically, means a polynucleotide fragment encoding the modified protein.

The polynucleotide encoding the fructose-4-epimerase variant of the present application may include any polynucleotide without limitation as long as it is a polynucleotide sequence encoding the fructose-4-epimerase variant of the present application. For example, the polynucleotide encoding the fructose-4-epimerase variant of the present application may be a polynucleotide sequence encoding an amino acid sequence included in the variant of the present application, but is not limited thereto. In the polynucleotide, various modifications may be made to the coding region because of the codon degeneracy or in consideration of codons preferred in the organism intended to express the enzyme variant of the present application within a range in which the amino acid sequence of the enzyme variant of the present application is not changed. Hence, it is apparent that a polynucleotide that may be translated into an amino acid sequence included in the variant of the present application or an amino acid sequence having homology or identity thereto may also be included because of the codon degeneracy.

Any sequence encoding the fructose-4-epimerase variant by hybridizing with a probe that may be prepared from a known gene sequence, for example, a complementary sequence to all or part of the nucleic acid sequence of the polynucleotide of the present application under stringent conditions may be included without limitation.

The "stringent condition" means a condition that enables specific hybridization between polynucleotides. These conditions are specifically described in literatures (see Sambrook et al., supra, 9.50-9.51, 11.7-11.8). Examples thereof include a condition in which genes having high homology or identity, namely, genes having 70% or more, 80% or more, 85% or more, specifically 90% or more, more specifically 95% or more, still more specifically 97% or more, and particularly specifically 99% or more homology or identity hybridize with each other, and genes having homology or identity lower than this do not hybridize with each other, or a condition in which washing is performed one time, specifically 2 to 3 times at a salt concentration and temperature corresponding to 60° C., 1×SSC, and 0.1% SDS, specifically 60° C., 0.1×SSC, and 0.1% SDS, and more specifically 68° C., 0.1×SSC, and 0.1% SDS, which are the washing conditions of conventional Southern hybridization.

Hybridization requires that two nucleic acids have complementary sequences even though mismatch between bases is possible depending on the stringency of hybridization. The term "complementary" is used to describe the relation between nucleotide bases capable of hybridizing with each other. For example, with regard to DNA, adenosine is complementary to thymine, and cytosine is complementary to guanine. Hence, the present application may also include isolated nucleic acid fragments that are complementary to substantially similar nucleic acid sequences as well as the entire sequence.

Specifically, polynucleotides having homology or identity may be detected using hybridization conditions including a hybridization step at a $T_m$ value of 55° C. and using the above-described conditions. The $T_m$ value may be 60° C., 63° C., or 65° C., but is not limited thereto and may be appropriately adjusted by those skilled in the art depending on the purpose.

The appropriate stringency for hybridizing polynucleotides depends on the length and degree of complementarity of the polynucleotides, and the parameters are well known in the art (for example, J. Sambrook et al., supra).

As used herein, the term "homology" or "identity" means the degree to which two given amino acid sequences or nucleic acid sequences are related to each other and may be expressed as a percentage.

The terms "homology" and "identity" may often be used interchangeably.

The sequence homology or identity of a conserved polynucleotide or polypeptide is determined by standard alignment algorithms, and a default gap penalty established by the program being used may be used together. Substantially, homologous or identical sequences may hybridize with each other to generally about 50%, 60%, 70%, 80%, or 90% or more of the entire sequence or full-length sequence under moderate or high stringent conditions. For hybridization, polynucleotides containing degenerate codons instead of codons are also considered in the polynucleotides.

Whether arbitrary two polynucleotide or polypeptide sequences have homology, similarity, or identity may be determined, for example, using default parameters as in Pearson et al (1988) Proc. Natl. Acad. Sci. USA 85:2444 and known computer algorithms such as the "FASTA" program. Alternatively, the Needleman-Wunsch algorithm (Needleman and Wunsch, 1970, *J. Mol. Biol.* 48:443-453) as performed in the Needleman program of the EMBOSS package (EMBOSS: The European Molecular Biology Open Software Suite, Rice et al., 2000, *Trends Genet.* 16:276-277) (version 5.0.0 or later) may be used to determine the homology, similarity, or identity (including GCG program package (Devereux, J. et al., *Nucleic Acids Research* 12:387 (1984)), BLASTP, BLASTN, FASTA (Atschul, S. F. et al., *J MOLEC BIOL* 215:403 (1990); *Guide to Huge Computers*, Martin J. Bishop, ed., Academic Press, San Diego, 1994, and CARILLO et al. (1988) *SIAM J Applied Math* 48:1073). For example, BLAST from the National Center for Biotechnology Information, or ClustalW may be used to determine the homology, similarity, or identity.

The homology, similarity, or identity of polynucleotides or polypeptides may be determined by comparing the sequence information, for example, using a GAP computer program such as Needleman et al. (1970), *J Mol Biol.* 48:443, for example, as known in Smith and Waterman, *Adv. Appl. Math* (1981) 2:482. In summary, the homology, similarity, or identity may be defined as the value acquired by dividing the number of similarly arranged symbols (namely, nucleotides or amino acids) by the total number of symbols in the shorter of the two sequences in a GAP program. Default parameters for the GAP program may include (1) binary comparison matrix (containing values of 1 for identity and 0 for non-identity) and weighted comparison matrix of Gribskov et al. (1986) *Nucl. Acids Res.* 14:6745 (or EDNAFULL (EMBOSS version of NCBI NUC4.4) substitution matrix) as disclosed by Schwartz and Dayhoff, eds., *Atlas Of Protein Sequence And Structure*, National Biomedical Research Foundation, pp. 353-358 (1979); (2) a penalty of 3.0 for each gap and an additional penalty of 0.10 for each symbol in each gap (or a gap opening penalty of 10, a gap extension penalty of 0.5); and (3) no penalty for an end gap. Hence, as used herein, the term "homology" or "identity" refers to a relatedness between sequences.

As used herein, the term "vector" means a DNA preparation containing the nucleic acid sequence of a polynucleotide encoding a target modified protein, operably linked to a suitable control sequence so that the target modified protein can be expressed in a suitable host. The control sequence may include a promoter capable of initiating transcription, an arbitrary operator sequence for regulating such transcription, a suitable mRNA ribosome binding site, and a sequence for controlling the termination of transcription and translation. After being transformed into a suitable host cell, the vector may be replicated or function independently of the host genome and may be integrated into the genome itself.

The vector used in the present application is not particularly limited as long as it can be replicated in the host cell, and an arbitrary vector known in the art may be used. Examples of commonly used vectors include plasmids, cosmids, viruses and bacteriophages in a natural or recombinant state. For example, pWE15, M13, MBL3, MBL4, IXII, ASHII, APII, t10, t11, Charon4A, Charon21A and the like may be used as a phage vector or cosmid vector, and a pBR system, a pUC system, a pBluescript II system, a pGEM system, a pTZ system, a pCL system, a pET system and the like may be used as a plasmid vector. Specifically, pDZ, pACYC177, pACYC184, pCL, pECCG117, pUC19, pBR322, pMW118, and pCC1BAC vectors and the like may be used.

As an example, a polynucleotide encoding a target modified protein (or an enzyme variant) may be replaced with a mutated polynucleotide in a chromosome through a vector for intracellular chromosome insertion. The insertion of a polynucleotide into a chromosome may be performed by an arbitrary method known in the art, for example, homologous recombination, but is not limited thereto. The vector may further include a selection marker for determining whether the vector is inserted into a chromosome. The selection marker is used to select cells transformed with the vector, that is, to confirm whether a target nucleic acid molecule is inserted, and markers that impart selectable phenotypes such as drug resistance, auxotrophy, resistance to cytotoxic agents or expression of surface modified protein may be used. In an environment treated with a selective agent, only cells expressing the selection marker survive or exhibit other expression traits, and thus transformed cells may be selected. The present application can provide a microorganism producing tagatose, which comprises the modified protein or a polynucleotide encoding the modified protein. Specifically, the microorganism comprising a modified protein and/or a polynucleotide encoding the modified protein may be a microorganism prepared by being transformed with a vector comprising the polynucleotide encoding the modified protein, but is not limited thereto.

In the present application, the term "transformation" means to introduce a vector comprising a polynucleotide encoding a target protein (namely, the variant of the present application) into a host cell so that the protein encoded by the polynucleotide may be expressed in the host cell. The transformed polynucleotide may include all polynucleotides regardless of whether the polynucleotides are located by being inserted into the chromosome of the host cell or located outside the chromosome as long as they can be expressed in the host cell. The polynucleotide includes DNA and RNA encoding a target protein. The polynucleotide may be introduced in any form as long as it can be introduced into and expressed in a host cell. For example, the polynucleotide may be introduced into a host cell in the form of an expression cassette, which is a gene construct including all elements necessary for self-expression. The expression cassette may usually include a promoter operably linked to the polynucleotide, a transcription termination signal, a ribosome binding site, and a translation termination signal. The expression cassette may be in the form of an expression vector capable of self-replication. The polynucleotide may be introduced into a host cell in its own form and operably linked to a sequence necessary for expression in the host cell, but is not limited thereto.

As used above, the term "operably linked" means that a promoter sequence, which initiates and mediates transcription of a polynucleotide encoding the target modified protein of the present application, and the gene sequence are functionally linked to each other.

Another aspect of the present application is to provide a microorganism comprising the fructose-4-epimerase variant of the present application, a polynucleotide encoding the fructose-4-epimerase variant of the present application, or a vector comprising the polynucleotide of the present application.

The microorganism of the present application may be a microorganism producing the fructose-4-epimerase variant or tagatose.

As used herein, the term "microorganism comprising a fructose-4-epimerase variant" may mean a microorganism recombined so as to express the fructose-4-epimerase variant of the present application. For example, the microorganism means a host cell or microorganism that comprises a polynucleotide encoding a fructose-4-epimerase variant or is transformed with a vector comprising the polynucleotide encoding a fructose-4-epimerase variant and may thus express the variant.

The fructose-4-epimerase variant of the present application may be obtained by transforming DNA expressing the variant of the present application into a strain such as *E. coli*, culturing the strain to obtain a culture, crushing the culture, and purifying the crushed product through a column or the like. The strain for transformation may include, in addition to *Escherichia coli*, *Corynebacterium glutamicum*, *Aspergillus oryzae*, and *Bacillus subtilis*, but is not limited thereto.

The microorganism of the present application may include both a prokaryotic microorganism and a eukaryotic microorganisms as long as it is a microorganism, which comprises the polynucleotide of the present application or the vector of the present application and can produce the fructose-4-epimerase of the present application. For example, the microorganism of the present application may include microbial strains belonging to the genus *Escherichia*, the genus *Erwinia*, the genus *Serratia*, the genus *Providencia*, the genus *Corynebacterium*, and the genus *Brevibacterium*, but is not limited thereto.

The microorganism of the present application may include all microorganisms capable of expressing the fructose-4-epimerase of the present application by various known methods in addition to the introduction of the nucleic acid or vector.

The culture of the microorganism of the present application may be prepared by culturing a microorganism expressing the fructose-4-epimerase of the present application in a medium.

In the method, the term "culture" means growing the microorganism in an appropriately controlled environmental condition. The process of culturing the microorganism is not particularly limited, but may be performed by a batch culture method, a continuous culture method, a fed-batch culture method, and the like that are known. At this time, the culture conditions are not particularly limited, but the pH may be adjusted to an appropriate pH (for example, pH 5 to 9, specifically pH 6 to 8, and most specifically pH 6.8) using basic compounds (for example, sodium hydroxide, potassium hydroxide or ammonia) or acidic compounds (for example, phosphoric acid or sulfuric acid), and oxygen or oxygen-containing gas mixtures may be introduced into the culture to maintain aerobic conditions. The culture temperature may be maintained at 20° C. to 45° C., specifically 25° C. to 40° C., and the microorganism may be cultured for about 10 to 160 hours, but the culture conditions are not limited thereto.

In addition, with regard to the culture medium used, as carbon sources, sugars and carbohydrates (for example, glucose, sucrose, lactose, fructose, maltose, molasses, starch and cellulose), oils and fats (for example, soybean oil, sunflower oil, peanut oil and coconut oil), fatty acids (for example, palmitic acid, stearic acid, and linoleic acid), alcohols (for example, glycerol and ethanol), and organic acids (for example, acetic acid) may be used individually or in mixture, but the carbon sources are not limited thereto. As nitrogen sources, nitrogen-containing organic compounds (for example, peptone, yeast extract, broth, malt extract, corn steep liquor, soy flour and urea) or inorganic compounds (for example, ammonium sulfate, ammonium chloride, ammonium phosphate, ammonium carbonate, and ammonium nitrate) may be used individually or in mixture, but the nitrogen sources are not limited thereto. As phosphorus sources, potassium dihydrogen phosphate, dipotassium hydrogen phosphate, and sodium-containing salts corresponding thereto may be used individually or in mixture, but the phosphorus sources are not limited thereto. The medium may contain essential growth-promoting substances such as other metal salts (for example, magnesium sulfate or iron sulfate), amino acids and vitamins.

Another aspect of the present application is to provide a composition for tagatose production comprising the fructose-4-epimerase variant of the present application; a microorganism comprising the variant of the present application, a polynucleotide encoding the variant of the present application, or a vector comprising the polynucleotide of the present application; or a culture of the microorganism of the present application.

The composition for tagatose production of the present application may further contain fructose.

The composition for tagatose production of the present application may further contain any suitable excipients commonly used in compositions for tagatose production. Such excipients may be, for example, preservatives, wetting agents, dispersing agents, suspending agents, buffers, stabilizing agents, or isotonic agents, but are not limited thereto.

The composition for tagatose production of the present application may further contain a metal ion or a metal salt. In an embodiment, the metal of the metal ion or metal salt may be a metal including a divalent cation. Specifically, the metal of the present application may be nickel (Ni), iron (Fe), cobalt (Co), magnesium (Mg), or manganese (Mn). More specifically, the metal salt may be $NiSO_4$, $NiCl_2$, $FeSO_4$, $MgSO_4$, $MgCl_2$, $CoSO_4$, $MnCl_2$, or $MnSO_4$.

Another aspect of the present application is to provide a method for preparing tagatose, the method comprising: (a) bringing the fructose-4-epimerase variant of the present application; a microorganism comprising the variant of the present application, a polynucleotide encoding the variant of the present application, or a vector comprising the polynucleotide of the present application; or a culture of the microorganism of the present application into contact with fructose; and (b) converting the fructose into tagatose.

As an example, the contact of the present application may be performed under a pH 5.0 to pH 9.0 condition and a 30° C. to 80° C. temperature condition and/or for 0.5 hours to 48 hours.

Specifically, the contact of the present application may be performed under a pH 6.0 to pH 9.0 condition or pH 7.0 to pH 9.0 condition. The contact of the present application may be performed under a 35° C. to 80° C., 40° C. to 80° C., 45° C. to 80° C., 50° C. to 80° C., 55° C. to 80° C., 60° C. to 80° C., 30° C. to 70° C., 35° C. to 70° C., 40° C. to 70° C., 45° C. to 70° C., 50° C. to 70° C., 55° C. to 70° C., 60° C. to 70° C., 30° C. to 65° C., 35° C. to 65° C., 40° C. to 65° C., 45° C. to 65° C., 50° C. to 65° C., 55° C. to 65° C., 30° C. to 60° C., 35° C. to 60° C., 40° C. to 60° C., 45° C. to 60° C., 50° C. to 60° C., or 55° C. to 60° C. temperature condition. The contact of the present application may be performed for 0.5 hours to 36 hours, for 0.5 hours to 24 hours, for 0.5 hours to 12 hours, for 0.5 hours to 6 hours, for 1 hour to 48 hours, for 1 hour to 36 hours, for 1 hour to 24 hours, for 1 hour to 12 hours, for 1 hour to 6 hours, for 3 hours to 48 hours, for 3 hours to 36 hours, for 3 hours to 24 hours, for 3 hours to 12 hours, for 3 hours to 6 hours, for 6 hours to 48 hours, for 6 hours to 36 hours, for 6 hours to 24 hours, for 6 hours to 12 hours, for 12 hours to 48 hours, for 12 hours to 36 hours, for 12 hours to 24 hours, for 18 hours to 48 hours, for 18 hours to 36 hours, or for 18 hours to 30 hours.

The contact of the present application may be performed in the presence of a metal ion or a metal salt. The metals that can be used are the same as those in the previous aspect.

The preparation method of the present application may further comprise a step of separating and/or purifying the prepared tagatose. The separation and/or purification may be performed by a method commonly used in the technical field of the present application. As non-limiting examples, dialysis, precipitation, adsorption, electrophoresis, ion exchange chromatography, and fractional crystallization may be used. The purification may be performed by only one method or by two or more methods.

The preparation method of the present application may further comprise a step of performing decolorization and/or desalting before or after the separation and/or purification step. By performing the decolorization and/or desalting, tagatose that is significantly excellent in quality may be obtained.

As another example, the preparation method of the present application may further comprise a step of crystallizing tagatose after the step of converting fructose into tagatose of the present application, the separation and/or purification step, or the decolorization and/or desalting step. The crystallization may be performed by a crystallization method commonly used. For example, crystallization may be performed by a cooling crystallization method.

The preparation method of the present application may further comprise a step of concentrating tagatose before the crystallization step. The concentration may increase the crystallization efficiency.

As another example, the preparation method of the present application may further comprise a step of bringing unreacted fructose into contact with the enzyme of the present application, a microorganism expressing the enzyme, or a culture of the microorganism after the separation and/or purification step of the present application; a step of reusing the mother liquor from which crystals have been separated in the separation and/or purification step after the crystallization step of the present application; or a combination thereof. It is economically advantageous to comprise the additional steps since tagatose can be obtained with a higher yield and the amount of wasted fructose can be decreased.

EXAMPLES

Hereinafter, the present application will be described in more detail with reference to Examples. However, the Examples are for illustrative purposes only, and the scope of the present application is not limited to the Examples.

Example 1. Construction of Recombinant Expression Vector and Transformant Containing Fructose-4-Epimerase Gene

Example 1-1. Construction of Recombinant Expression Vector Containing Fructose-4-Epimerase Gene As the fructose-4-epimerase, an enzyme (hereinafter, KO) derived from *Kosmotoga olearia*, which was known to exhibit the activity of converting fructose into tagatose in Korean Patent publication No. 2018-0111678, was used.

Specifically, the fructose-4-epimerase gene was selected from the *Kosmotoga olearia* gene sequence registered in KEGG (Kyoto Encyclopedia of Genes and Genomes), and based on the amino acid sequence (SEQ ID NO: 1) and nucleic acid sequence (SEQ ID NO: 2) of the fructose-4-epimerase gene, a recombinant expression vector pBT7-C-His-KO inserted into pBT7-C-His, a vector capable of expressing *E. coli*, was synthesized and constructed by BIONEER.

Example 1-2. Construction of KO Variant Library and Screening of Activity-Improved Variant Using the gene selected in Example 1-1 as a template, a KO variant library was constructed through random mutagenesis. Specifically, random mutagenesis was conducted to induce 2 to 3 mutations per 1000 base pairs in the KO gene using the Diversify random mutagenesis kit (ClonTech). The PCR reaction conditions are presented in Tables 1 and 2 below. A gene library encoding the KO variant was constructed and then inserted into *E. coli* BL21 (DE3).

TABLE 1

| Composition of reaction solution | Amount added (μL) |
|---|---|
| PCR Grade Water | 36 |
| 10X TITANIUM Taq Buffer | 5 |
| MnSO4 (8 mM) | 4 |
| dGTP (2 mM) | 1 |

TABLE 1-continued

| Composition of reaction solution | Amount added (μL) |
|---|---|
| 50X Diversify dNTP Mix | 1 |
| Primer mix | 1 |
| Template DNA | 1 |
| TITANIUM Taq Polym. | 1 |

TABLE 2

| Step | Temperature (° C.) | Time (sec) | Cycles |
|---|---|---|---|
| Initial Denaturation | 94 | 30 | 1 |
| Denaturation | 94 | 30 | 25 |
| Annealing/Extension | 68 | 60 | |
| Final Extension | 68 | 60 | 1 |
| Soak | 4 | — | |

*E. coli* BL21 (DE3) having a pBT7-C-His plasmid containing the KO variant gene was inoculated into a deep-well rack containing 0.2 mL of LB liquid medium containing ampicillin antibiotic, and seed culture was performed in a shaking incubator at 37° C. for 16 hours or more. The culture solution obtained as a result of the seed culture was inoculated into a culture deep-well rack containing a liquid medium containing LB and lactose, a protein expression regulator, and the main culture was performed. The seed culture and the main culture were conducted under conditions of a stirring speed of 180 rpm and 37° C. Next, the main culture solution was centrifuged at 4,000 rpm and 4° C. for 20 minutes, and the cells were recovered and used for the activity test.

For large-scale high-speed screening of activity-improved mutated enzymes in the constructed random mutagenesis library, a colorimetric assay capable of specifically quantifying D-fructose was used. Specifically, 70% Folin-Ciocalteu reagent (SIGMA-ALDRICH) and substrate reaction completion solution were mixed at a 15:1 ratio and reacted at 80° C. for 5 minutes, and cells containing the gene of the wild-type enzyme (KO, SEQ ID NO: 1) and cells containing variant genes exhibiting higher activity (conversion from D-fructose to D-tagatose) in the relative activity comparison were selected based on the OD values measured at 900 nm. Among these, ten colonies exhibiting the highest activity were selected and sequenced to identify the nucleic acid sequences thereof. As a result, it has been confirmed that the amino acid residues at positions 97, 124, 158, 210, 239, 318, 321, 367, and 390 from the N-terminus are mutated. The variant T124W_N97Y_N367V exhibiting the highest activity was secured.

TABLE 3

| Mutation position | Additional mutation | Relative activity (%) to WT (KO) |
|---|---|---|
| T124WN97Y | T210D | 347 |
| T124WN97Y | T210S | 421 |
| T124WN97Y | T210K | 370 |
| T124WN97Y | T210L | 417 |
| T124WN97Y | T210V | 806 |
| T124WN97Y | T210G | 870 |
| T124WN97Y | P318H | 337 |
| T124WN97Y | P318G | 635 |
| T124WN97Y | P318I | 479 |
| T124WN97Y | P318A | 571 |
| T124WN97Y | P318C | 854 |

TABLE 4

| Mutation position | Existing sequence | Mutated sequence | Relative activity (%) to WT (KO) |
|---|---|---|---|
| 239 | N | V | 112 |
|  |  | G | 242 |
|  |  | A | 226 |
|  |  | E | 132 |
|  |  | K | 215 |
|  |  | W | 102 |
|  |  | L | 169 |
|  |  | P | 139 |

Example 2. Construction of Mutated Enzyme and Comparative Evaluation of Activity In order to evaluate the conversion activity of the recombinant variant T124W_N97Y_N367V secured in Example 1-2 in fructose-4-epimerization, purified KO and purified T124W_N97Y_N367V were obtained. Specifically, each of the microorganism comprising the gene of KO and the microorganism comprising the gene of the variant T124W_N97Y_N367V was inoculated into a culture tube containing 5 mL of LB liquid medium containing ampicillin antibiotic, and seed culture was conducted in a shaking incubator at 37° C. until the absorbance at 600 nm reached 2.0. The culture solution obtained as a result of the seed culture was inoculated into a culture flask containing a liquid medium containing LB and lactose, a protein expression regulator, and main culture was conducted. The seed culture and the main culture were conducted under conditions of a stirring speed of 180 rpm and 37° C. Next, the main culture solution was centrifuged at 8,000 rpm and 4° C. for 20 minutes, and the cells were recovered. The recovered cells were washed with 50 mM Tris-HCl (pH 8.0) buffer 2 times, and resuspended in 50 mM $NaH_2PO_4$ (pH 8.0) buffer containing 10 mM imidazole and 300 mM NaCl. The resuspended cells were crushed using a sonicator, centrifugation was conducted at 13,000 rpm and 4° C. for 20 minutes, and then only the supernatant was taken. The supernatant was purified by His-tag affinity chromatography, and a 50 mM $NaH_2PO_4$ (pH 8.0) buffer containing 20 mM imidazole and 300 mM NaCl was allowed to flow in a volume to be 10 times the volume of the filler to remove proteins, which might be nonspecifically bound. Subsequently, a 50 mM $NaH_2PO_4$ (pH 8.0) buffer containing 250 mM imidazole and 300 mM NaCl was additionally allowed to flow for elution and purification, and then dialysis with 50 mM Tris-HCl (pH 8.0) buffer was conducted to secure each purified enzyme.

In order to measure the fructose-4-epimerization activity of the obtained purified enzymes, 50 mM Tris-HCl (pH 8.0), 3 mM $MnSO_4$, and 2 mg/mL of each enzyme were added to 30 wt % fructose and reacted for maximum 2 hours at the respective temperatures (50° C. and 60° C.). As a result, the conversion activity of the wild-type enzyme (KO) was 4.1% and 5.2%, respectively, and the conversion activity of the variant was 17.3% and 23.7%, respectively, under the reaction conditions of 120 min and 50° C. and 60° C. In other words, the activity of the variant T124W_N97Y_N367V was increased compared to that of the wild-type enzyme (KO), and the specific results are as presented in Table 5 below.

TABLE 5

| Time (min) | WT(KO) | | T124W_N97Y_N367V | |
|---|---|---|---|---|
|  | 50° C. | 60° C. | 50° C. | 60° C. |
| 0 | 0.3% | 0.3% | 0.5% | 0.5% |
| 30 | 1.4% | 2.1% | 8.4% | 13.3% |
| 60 | 1.8% | 3.5% | 11.9% | 18.6% |
| 120 | 4.1% | 5.2% | 17.3% | 23.7% |

Example 3. Construction of Additionally Mutated Enzyme and Selection of Activity-Improved Mutated Enzyme

Example 3-1. Site-Directed Mutagenesis

The 390th threonine from the N-terminus of T124W_N97Y_N367V selected in Example 1-2 was substituted with arginine by a site-directed mutagenesis using a specific primer.

Specifically, a N-terminal primer (SEQ ID NO: 3: AAAGAAATCCCGTTAAGACTTATAAGCCAGTTC) and a C-terminal primer (SEQ ID NO: 4: GAACTGGCTTATAAGTCTTAACGGGATTTCTTT), which are oligonucleotides of two complementary nucleic acid sequences having mutations, were used as primers. A plasmid having a new mutation was amplified and synthesized in a tube using plasmid DNA as a template, and then the original template DNA was removed by digestion with Dpn I restriction enzyme. In other word, the mutated DNA, which is selected in Example 1-2 and used as a template, is DNA isolated from E. coli and is cut by Dpn I, which recognizes and cuts Gm6 ATC, but the mutated DNA synthesized in the tube is not cut. This was transformed into E. coli DH5alpha to obtain a mutant, and then the nucleic acid sequence of the mutant gene was analyzed to confirm that the mutation properly occurred. In other word, T124W_N97Y_N367V_T390R variant, in which a total of four amino acid sequences were mutated, was constructed. This variant was transformed into the expression strain E. coli BL21(DE3) to construct a recombinant strain E. coli BL21(DE3)_T124W_N97Y_N367V_T390R.

Example 3-2. Construction of Activity-Improved Mutated Enzyme and Comparative Evaluation of Activity The E. coli BL21(DE3)_T124W_N97Y_N367V_T390R constructed in Example 3-1 was inoculated into a culture tube containing 5 mL of LB liquid medium containing ampicillin antibiotic, and seed culture was conducted in a shaking incubator at 37° C. until the absorbance at 600 nm reached 2.0. The culture solution obtained as a result of the seed culture was inoculated into a culture flask containing a liquid medium containing LB and lactose, a protein expression regulator, and main culture was conducted. The seed culture and the main culture were conducted under conditions of a stirring speed of 180 rpm and 37° C. Next, the main culture solution was centrifuged at 8,000 rpm and 4° C. for 20 minutes, and the cells were recovered. The recovered cells were washed with 50 mM Tris-HCl (pH 8.0) buffer 2 times, and resuspended in 50 mM $NaH_2PO_4$ (pH 8.0) buffer containing 10 mM imidazole and 300 mM NaCl. The resuspended cells were crushed using a sonicator, centrifugation was conducted at 13,000 rpm and 4° C. for 20 minutes, and then only the supernatant was taken. The supernatant was purified by His-tag affinity chromatography, and a 50 mM NaH$_2$PO$_4$ (pH 8.0) buffer containing 20 mM imidazole and 300 mM NaCl was allowed to flow in a volume to be 10 times the volume of the filler to remove proteins, which might be nonspecifically bound. Subsequently, a 50 mM NaH$_2$PO$_4$ (pH 8.0) buffer containing 250 mM imidazole and 300 mM NaCl was additionally allowed to flow for elution and purification, and then dialysis with 50 mM Tris-HCl (pH 8.0) buffer was conducted to secure purified enzyme T124W_N97Y_N367V_T390R (hereinafter, WRVY) for analysis of enzyme properties.

In order to measure the fructose-4-epimerization activity of the secured WRVY, 50 mM Tris-HCl (pH 8.0), 3 mM MnSO$_4$, and 2 mg/mL of each of T124W_N97Y_N367V and WRVY were added to 30 wt % fructose and reacted for 0.5 hours at 60° C.

As a result, WRVY exhibited a conversion rate higher than that of the wild type by 8 times or more. The specific results are as presented in Table 6 below.

TABLE 6

|  | 0.5 H |
|---|---|
| WT | 2.1% |
| T124W_N97Y_N367V | 13.7% |
| T124W_N97Y_N367V_T390R(WRVY) | 17.8% |

Example 3-3. Saturation Mutagenesis

In order to develop a mutated enzyme exhibiting additionally improved unit activity in the fructose-4-epimerization conversion reaction by using the variant WRVY constructed in Example 3-1, two (158th and 321st) activity-improved sites selected in Example 1-2 were used as a template for saturation mutagenesis for additional construction of mutant library. Inversed PCR-based saturation mutagenesis was used in consideration of mutation distribution diversity and variant yield (2014. Anal. Biochem. 449:90-98). In order to minimize the screening scale of the constructed variant library (minimize the number of codons introduced during saturation mutagenesis), the stop codon was excluded and NDT/VMA/ATG/TGG mixed primer with minimized E. coli rare codons (2012. Biotechniques 52:149-158) was designed and used. Specifically, primers were constructed and used with a total length of 33 bp, including 15 bp of the front base, 3 bp of the substitution base, and 15 bp of the rear base of each site. As the PCR conditions, denaturation at 94° C. for 2 minutes, then denaturation at 94° C. for 30 seconds, annealing at 60° C. for 30 seconds, and extension at 72° C. for 10 minutes were repeated 30 times, followed by extension reaction at 72° C. for 60 minutes. A saturation mutagenesis library for each selected amino acid site was constructed, variants for each library were randomly selected (<11 mutations), and the nucleic acid sequences were analyzed to evaluate the distribution of amino acid mutations. Based on the analysis results, a screening scale of 90% or more of sequence coverage for each library was set (2003. Nucleic Acids Res. 15; 31:e30).

Through the saturation mutagenesis, a high-activity candidate variant was constructed, and nucleic acid sequence analysis was conducted to confirm the displacement site added in WRVY. Through this, a total of 18 variants were secured (Table 7).

TABLE 7

| Additionally mutated position | Kind of substituted amino acid |   |   |   |   |   |   |   |   |
|---|---|---|---|---|---|---|---|---|---|
| C158 | Q | H | A | V | G | T | E | M | R | L |
| C321 | L | E | N | I | K | A | G | V |   |   |

Example 3-4. Construction of Activity-Improved Mutated Enzyme

In order to comparatively evaluate the fructose-4-epimerization activity of multi-site mutated enzymes, the saturation mutagenesis library gene constructed in Example 3-3 was transformed into E. coli BL21 (DE3), then each transformed microorganism was inoculated into a culture tube containing 5 mL of LB liquid medium containing ampicillin antibiotic, and seed culture was conducted in a shaking incubator at 37° C. until the absorbance at 600 nm reached 2.0. The culture solution obtained as a result of the seed culture was inoculated into a culture flask containing a liquid medium containing LB and lactose, a protein expression regulator, and main culture was conducted. The seed culture and the main culture were conducted under conditions of a stirring speed of 180 rpm and 37° C. Next, the main culture solution was centrifuged at 8,000 rpm and 4° C. for 20 minutes, and the cells were recovered. The recovered cells were washed with 50 mM Tris-HCl (pH 8.0) buffer 2 times, and resuspended in 50 mM NaH$_2$PO$_4$ (pH 8.0) buffer containing 10 mM imidazole and 300 mM NaCl. The resuspended cells were crushed using a sonicator, centrifugation was conducted at 13,000 rpm and 4° C. for 20 minutes, and then only the supernatant was taken. The supernatant was purified by His-tag affinity chromatography, and a 50 mM NaH$_2$PO$_4$ (pH 8.0) buffer containing 20 mM imidazole and 300 mM NaCl was allowed to flow in a volume to be 10 times the volume of the filler to remove proteins, which might be nonspecifically bound. Subsequently, a 50 mM NaH$_2$PO$_4$ (pH 8.0) buffer containing 250 mM imidazole and 300 mM NaCl was additionally allowed to flow for elution and purification, and then dialysis with 50 mM Tris-HCl (pH 8.0) buffer was conducted to secure each purified enzyme for analysis of enzyme properties.

Example 4. Comparative Evaluation of Properties of Mutated Enzyme with Improved Activity and Stability In order to measure the fructose-4-epimerization activity of the variants secured in Example 3-4, 50 mM Tris-HCl (pH 8.0), 3 mM MnSO$_4$, and 2 mg/mL of each variant were added to 30 wt % fructose and reacted for 0.5 hours at 60° C. In order to measure the thermostability of the secured variants, each purified enzyme was added at a concentration of 5 mg/mL, the enzyme solution was left at 60° C. for minimum 19 hours to maximum 90 hours, then on ice for 5 minutes, the enzyme solution sampled by time, 50 mM Tris-HCl (pH 8.0) and 3 mM MnSO$_4$ were added to 30 wt % fructose to conduct enzyme reaction, and the residual activity of the enzyme was measured.

As a result, all of the variants exhibited a conversion rate higher than that of the wild-type enzyme (KO) by maximum 8 times or more. The specific results are as presented in Table 8 below. In addition, as a result of the thermostability investigation at 60° C., it has been confirmed that the variants exhibit thermostability superior to that of the wild-type enzyme (KO) as illustrated in FIGS. 2 and 3.

TABLE 8

| | 0.5 H |
|---|---|
| WT | 2.5% |
| T124W_N97Y_N367V | 13.9% |
| T124W_N97Y_N367V_T390R(WRVY) | 17.9% |
| T124W_N97Y_N367V_T390R + C158Q(WRVY + C158Q) | 18% |
| T124W_N97Y_N367V_T390R + C158H(WRVY + C158H) | 13.3% |
| T124W_N97Y_N367V_T390R + C158A(WRVY + C158A) | 17.3% |
| T124W_N97Y_N367V_T390R + C158V(WRVY + C158V) | 19% |
| T124W_N97Y_N367V_T390R + C158G(WRVY + C158G) | 20% |
| T124W_N97Y_N367V_T390R + C158T(WRVY + C158T) | 16.9% |
| T124W_N97Y_N367V_T390R + C158E(WRVY + C158E) | 18.9% |
| T124W_N97Y_N367V_T390R + C158M(WRVY + C158M) | 19.6% |
| T124W_N97Y_N367V_T390R + C158R(WRVY + C158R) | 17.1% |
| T124W_N97Y_N367V_T390R + C158L(WRVY + C158L) | 20.1% |
| T124W_N97Y_N367V_T390R + C321L(WRVY + C321L) | 19.5% |
| T124W_N97Y_N367V_T390R + C321E(WRVY + C321E) | 15.9% |
| T124W_N97Y_N367V_T390R + C321N(WRVY + C321N) | 18.0% |
| T124W_N97Y_N367V_T390R + C321I(WRVY + C321I) | 15.7% |
| T124W_N97Y_N367V_T390R + C321K(WRVY + C321K) | 13.7% |
| T124W_N97Y_N367V_T390R + C321A(WRVY + C321A) | 17.1% |
| T124W_N97Y_N367V_T390R + C321G(WRVY + C321G) | 16.9% |
| T124W_N97Y_N367V_T390R + C321V(WRVY + C321V) | 16.3% |

The present inventors transformed WRVY into *E. coli* BL21(DE3) strain to prepare a transformant (transformed microorganism) named *E. coli* BL21(DE3)/CJ_KO_F4E_WRVY, and deposited the transformant on Jul. 24, 2019 at the Korean Culture Center of Microorganisms (KCCM), an international depository under the Budapest Treaty, under the accession number KCCM12567P (*E. coli* BL21(DE3)/CJ_KO_F4E_WRVY).

Based on the above description, it will be understood by those skilled in the art that the present disclosure may be implemented in a different specific form without changing the technical spirit or essential characteristics thereof. Therefore, it should be understood that the above embodiment is not limitative, but illustrative in all aspects. The scope of the disclosure is defined by the appended claims rather than by the description preceding them, and thus all changes and modifications that fall within metes and bounds of the claims or equivalents of such metes and bounds are therefore intended to be embraced by the claims.

The invention claimed is:

1. A fructose-4-epimerase variant, comprising substitutions of amino acid residues corresponding to positions 97, 124, 367, and 390 from a N-terminus of a fructose-4-epimerase comprising the amino acid sequence of SEQ ID NO: 1 with other amino acids.

2. The fructose-4-epimerase variant according to claim 1, wherein the other amino acids are selected from the group consisting of a non-polar amino acid, a polar amino acid, and a basic amino acid.

3. The fructose-4-epimerase variant according to claim 2, wherein the non-polar amino acid, polar amino acid, and basic amino acid are selected from the group consisting of tyrosine (Y), tryptophan (W), valine (V), and arginine (R).

4. The fructose-4-epimerase variant according to claim 1, wherein the variant further comprises a substitution of an amino acid corresponding to position 158 or 321 with another amino acid.

5. The fructose-4-epimerase variant according to claim 4, wherein the another amino acid is selected from the group consisting of glutamine (Q), histidine (H), alanine (A), valine (V), glycine (G), threonine (T), glutamic acid (E), methionine (M), arginine (R), leucine (L), asparagine (N), isoleucine (I), and lysine (K).

6. The fructose-4-epimerase variant according to claim 1, wherein the variant further comprises a substitution of amino acid residues corresponding to one or more positions selected from the group consisting of position 210, position 239, and position 318 with other amino acids.

7. A polynucleotide encoding the fructose-4-epimerase variant according to claim 1.

8. A vector comprising the polynucleotide according to claim 7.

9. A microorganism comprising the fructose-4-epimerase variant according to claim 1 or a vector comprising a polynucleotide encoding the fructose-4-epimerase variant according to claim 1.

10. A composition for tagatose production, comprising the fructose-4-epimerase variant according to claim 1; a microorganism comprising the fructose-4-epimerase variant; or a culture of the microorganism.

11. The composition for tagatose production according to claim 10, wherein the composition further comprises fructose.

12. A method for preparing tagatose, the method comprising bringing the fructose-4-epimerase variant according to claim 1; a microorganism comprising the fructose-4-epimerase variant; or a culture of the microorganism into contact with fructose and converting fructose into tagatose.

* * * * *

SEQUENCE LISTING

```
<160> NUMBER OF SEQ ID NOS: 4

<210> SEQ ID NO 1
<211> LENGTH: 435
<212> TYPE: PRT
<213> ORGANISM: Unknown
<220> FEATURE:
<223> OTHER INFORMATION: Kosmotoga olearia
<220> FEATURE:
<221> NAME/KEY: PEPTIDE
<222> LOCATION: (1)..(435)
<223> OTHER INFORMATION: Tagatose-bisphosphate aldolase

<400> SEQUENCE: 1

Met Lys Lys His Pro Leu Gln Asp Ile Val Ser Leu Gln Lys Gln Gly
1               5                   10                  15

Ile Pro Lys Gly Val Phe Ser Val Cys Ser Ala Asn Arg Phe Val Ile
            20                  25                  30

Glu Thr Thr Leu Glu Tyr Ala Lys Met Lys Gly Thr Thr Val Leu Ile
        35                  40                  45

Glu Ala Thr Cys Asn Gln Val Asn Gln Phe Gly Gly Tyr Thr Gly Met
    50                  55                  60

Thr Pro Ala Asp Phe Arg Glu Met Val Phe Ser Ile Ala Glu Asp Ile
65                  70                  75                  80

Gly Leu Pro Lys Asn Lys Ile Ile Leu Gly Gly Asp His Leu Gly Pro
                85                  90                  95

Asn Pro Trp Lys Gly Gln Pro Ser Asp Gln Ala Met Arg Asn Ala Ile
            100                 105                 110

Glu Met Ile Arg Glu Tyr Ala Lys Ala Gly Phe Thr Lys Leu His Leu
        115                 120                 125

Asp Ala Ser Met Arg Leu Ala Asp Asp Pro Gly Asn Glu Asn Glu Pro
    130                 135                 140

Leu Asn Pro Glu Val Ile Ala Arg Thr Ala Leu Leu Cys Leu Glu
145                 150                 155                 160

Ala Glu Arg Ala Phe Lys Glu Ser Ala Gly Ser Leu Arg Pro Val Tyr
                165                 170                 175

Val Ile Gly Thr Asp Val Pro Pro Pro Gly Gly Ala Gln Asn Glu Gly
```

```
                    180                 185                 190
Lys Ser Ile His Val Thr Ser Val Gln Asp Phe Glu Arg Thr Val Glu
            195                 200                 205
Leu Thr Lys Lys Ala Phe Phe Asp His Gly Leu Tyr Glu Ala Trp Gly
        210                 215                 220
Arg Val Ile Ala Val Val Val Gln Pro Gly Val Glu Phe Gly Asn Glu
225                 230                 235                 240
His Ile Phe Glu Tyr Asp Arg Asn Arg Ala Arg Glu Leu Thr Glu Ala
                245                 250                 255
Ile Lys Lys His Pro Asn Ile Val Phe Glu Gly His Ser Thr Asp Tyr
            260                 265                 270
Gln Thr Ala Lys Ala Leu Lys Glu Met Val Glu Asp Gly Val Ala Ile
        275                 280                 285
Leu Lys Val Gly Pro Ala Leu Thr Phe Ala Leu Arg Glu Ala Phe Phe
    290                 295                 300
Ala Leu Ser Ser Ile Glu Lys Glu Leu Phe Tyr Asp Thr Pro Gly Leu
305                 310                 315                 320
Cys Ser Asn Phe Val Glu Val Val Glu Arg Ala Met Leu Asp Asn Pro
                325                 330                 335
Lys His Trp Glu Lys Tyr Tyr Gln Gly Glu Arg Glu Asn Arg Leu
            340                 345                 350
Ala Arg Lys Tyr Ser Phe Leu Asp Arg Leu Arg Tyr Tyr Trp Asn Leu
        355                 360                 365
Pro Glu Val Arg Thr Ala Val Asn Lys Leu Ile Thr Asn Leu Glu Thr
    370                 375                 380
Lys Glu Ile Pro Leu Thr Leu Ile Ser Gln Phe Met Pro Met Gln Tyr
385                 390                 395                 400
Gln Lys Ile Arg Asn Gly Leu Leu Arg Lys Asp Pro Ile Ser Leu Ile
                405                 410                 415
Lys Asp Arg Ile Thr Leu Val Leu Asp Asp Tyr Tyr Phe Ala Thr His
            420                 425                 430
Pro Glu Cys
        435

<210> SEQ ID NO 2
<211> LENGTH: 1308
<212> TYPE: DNA
<213> ORGANISM: Unknown
<220> FEATURE:
<223> OTHER INFORMATION: Kosmotoga olearia
<220> FEATURE:
<221> NAME/KEY: gene
<222> LOCATION: (1)..(1308)
<223> OTHER INFORMATION: Tagatose-bisphosphate aldolase

<400> SEQUENCE: 2
atgaaaaaac atcctcttca ggacattgtt tcattgcaaa aacagggaat acccaaaggg    60
gttttctctg tatgtagtgc caatagattt gttattgaaa ccactctgga atatgcgaag   120
atgaaaggga caacggttct tatagaggcc acctgcaatc aggtaaaacca gttcggtggc   180 tacaccggta tgactcctgc tgatttcaga gaaatggttt tttctatcgc tgaggatatt   240
ggacttccca aaaataaaat catccttggt ggcgaccatc ttggcccaaa tccctggaag   300
ggtcagccgt cagatcaggc tatgcgtaac gccattgaaa tgattcgaga atacgctaaa   360
gctgggttta ccaagcttca tctggatgcc agcatgcgtc ttgcagacga tccggggaac   420
gaaaacgagc cgctgaaccc ggaagttata gcggaaagaa cagctcttct ctgtcttgaa   480
```

-continued

```
gccgagaggg cttttaaaga atccgccggt tctctccggc ctgtttacgt tattggtacg      540
gatgttccgc caccgggtgg agcgcaaaac gaaggtaaat cgattcatgt aaccagtgtt      600
caggattttg agcgtaccgt tgagttgacc aaaaaggcat ttttcgacca tggtttgtat      660
gaagcctggg gaagggtgat tgcggttgtt gtgcaaccgg gagtagaatt cgggaatgaa      720
catatattcg aatatgatag aaatcgagcg agagaactta ctgaggcgat aaaaaagcat      780
ccaaatatag tttttgaagg tcactcgaca gattatcaaa cggcaaaagc attgaaagaa      840
atggtagaag acggtgtagc catactcaag gttgggccag ctctaacatt tgcgctcaga      900
gaggcttttt ttgcgttgag cagcattgaa aaagagttat tttatgatac acccgggctt      960
tgttcaaact ttgttgaagt tgtcgagaga gcgatgcttg acaatccaaa acattgggaa     1020
aaatattacc agggagaaga gagagaaaat agattagccc gtaaatacag ctttctcgat     1080
cgcttgaggt attactggaa tcttcctgag gttagaacag cggtgaataa gctgataacc     1140
aaccttgaaa caaagaaat cccgttaacg cttataagcc agttcatgcc gatgcagtac      1200
caaaaaatca gaacggttt gctaagaaag gatccaataa gccttataaa agatcgaatt     1260
acccttgttc ttgatgacta ctatttcgca actcaccctg aatgttga               1308

<210> SEQ ID NO 3
<211> LENGTH: 33
<212> TYPE: DNA
<213> ORGANISM: Artificial Sequence
<220> FEATURE:
<223> OTHER INFORMATION: Synthetic primer

<400> SEQUENCE: 3
aaagaaatcc cgttaagact tataagccag ttc                                   33

<210> SEQ ID NO 4
<211> LENGTH: 33
<212> TYPE: DNA
<213> ORGANISM: Artificial Sequence
<220> FEATURE:
<223> OTHER INFORMATION: Synthetic primer

<400> SEQUENCE: 4
gaactggctt ataagtctta acgggatttc ttt                                   33
```